United States Patent
Hussain et al.

(10) Patent No.: US 8,111,690 B2
(45) Date of Patent: Feb. 7, 2012

(54) ROUTING TRAFFIC THROUGH A VIRTUAL ROUTER-BASED NETWORK SWITCH

(75) Inventors: Zahid Hussain, San Jose, CA (US); Samir Jain, Cupertino, CA (US); Naveed Alam, Cupertino, CA (US); Joseph Cheng, Sunnyvale, CA (US); Greg Lockwood, Redwood City, CA (US); Tim Millet, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/260,524

(22) Filed: Oct. 29, 2008

(65) Prior Publication Data

US 2009/0073977 A1   Mar. 19, 2009

Related U.S. Application Data

(63) Continuation of application No. 11/671,462, filed on Feb. 5, 2007, now Pat. No. 7,522,604, which is a continuation of application No. 10/163,079, filed on Jun. 4, 2002, now Pat. No. 7,177,311.

(51) Int. Cl.
*H04L 12/56* (2006.01)

(52) U.S. Cl. ........................................ 370/389; 370/392

(58) Field of Classification Search ........................ None
See application file for complete search history.

(56) References Cited

U.S. PATENT DOCUMENTS

| | | |
|---|---|---|
| 4,590,468 A | 5/1986 | Stieglitz |
| 4,667,287 A | 5/1987 | Allen et al. |
| 4,667,323 A | 5/1987 | Engdahl et al. |
| 4,726,018 A | 2/1988 | Bux et al. |
| 5,371,852 A | 12/1994 | Attanasion et al. |
| 5,490,252 A | 2/1996 | Macera et al. |
| 5,491,691 A | 2/1996 | Shtayer et al. |
| 5,581,705 A | 12/1996 | Passint et al. |
| 5,598,414 A | 1/1997 | Walser et al. |
| 5,633,866 A | 5/1997 | Callon |
| 5,745,778 A | 4/1998 | Alfieri |
| 5,825,772 A | 10/1998 | Dobbins et al. |
| 5,841,973 A | 11/1998 | Kessler et al. |
| 5,841,990 A | 11/1998 | Picazzo et al. |
| 5,875,290 A | 2/1999 | Bartfal et al. |
| 5,892,924 A | 4/1999 | Lyon et al. |
| 5,920,705 A | 7/1999 | Lyon et al. |

(Continued)

OTHER PUBLICATIONS

Office Action dated Nov. 28, 2007 for U.S. Appl. No. 09/952,520.

(Continued)

*Primary Examiner* — Anthony Sol
(74) *Attorney, Agent, or Firm* — Morris & Kamlay LLP

(57) ABSTRACT

Methods and systems are provided for routing traffic through a virtual router-based network switch. According to one embodiment, a flow data structure is established that identifies current packet flows associated with multiple virtual routers in the virtual router-based network device. When an incoming packet is received by the virtual router-based network device, it is then determined whether the incoming packet is associated with a current packet flow by accessing the flow data structure based on a header associated with the incoming packet. If it is determined that the incoming packet is associated with the current packet flow, then the incoming packet is hardware forwarded via a network interface of the virtual router-based network device without intervention by a processor of the virtual router-based network device, otherwise the incoming packet is forwarded to software on the processor for flow learning.

3 Claims, 5 Drawing Sheets

U.S. PATENT DOCUMENTS

| | | |
|---|---|---|
| 5,963,555 A | 10/1999 | Takase et al. |
| 5,987,521 A | 11/1999 | Arrowood et al. |
| 6,032,193 A | 2/2000 | Sullivan |
| 6,047,330 A | 4/2000 | Stracke |
| 6,069,895 A | 5/2000 | Ayandeh |
| 6,098,110 A | 8/2000 | Witkowski et al. |
| 6,118,791 A | 9/2000 | Fichou et al. |
| 6,137,777 A | 10/2000 | Vaid et al. |
| 6,169,739 B1 | 1/2001 | Isoyama |
| 6,173,399 B1 | 1/2001 | Gilbrech |
| 6,175,867 B1 | 1/2001 | Taghadoss |
| 6,212,556 B1 | 4/2001 | Arunachalam |
| 6,220,768 B1 | 4/2001 | Barroux |
| 6,226,788 B1 | 5/2001 | Schoening et al. |
| 6,243,580 B1 | 6/2001 | Garner |
| 6,246,682 B1 | 6/2001 | Roy et al. |
| 6,249,519 B1 | 6/2001 | Rangachar |
| 6,256,295 B1 | 7/2001 | Callon |
| 6,260,072 B1 | 7/2001 | Rodriguez |
| 6,260,073 B1 | 7/2001 | Walker et al. |
| 6,266,695 B1 | 7/2001 | Huang et al. |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,317,748 B1 | 11/2001 | Menzies et al. |
| 6,324,583 B1 | 11/2001 | Stevens |
| 6,330,602 B1 | 12/2001 | Law et al. |
| 6,338,092 B1 | 1/2002 | Chao et al. |
| 6,339,782 B1 | 1/2002 | Gerard et al. |
| 6,343,083 B1 | 1/2002 | Mendelson et al. |
| 6,434,619 B1 | 8/2002 | Lim et al. |
| 6,449,650 B1 | 9/2002 | Westfall et al. |
| 6,459,682 B1 | 10/2002 | Ellesson et al. |
| 6,463,061 B1 | 10/2002 | Rekhter et al. |
| 6,466,976 B1 | 10/2002 | Alles et al. |
| 6,487,666 B1 | 11/2002 | Shanklin |
| 6,496,935 B1 * | 12/2002 | Fink et al. ................... 726/13 |
| 6,526,056 B1 | 2/2003 | Rekhter et al. |
| 6,532,088 B1 | 3/2003 | Dantu |
| 6,542,466 B1 | 4/2003 | Pashtan et al. |
| 6,542,502 B1 | 4/2003 | Herring et al. |
| 6,542,515 B1 | 4/2003 | Kumar et al. |
| 6,556,544 B1 | 4/2003 | Lee |
| 6,597,956 B1 | 7/2003 | Aziz et al. |
| 6,608,816 B1 | 8/2003 | Nichols |
| 6,609,153 B1 | 8/2003 | Salkewicz |
| 6,611,498 B1 | 8/2003 | Baker et al. |
| 6,611,522 B1 | 8/2003 | Zheng et al. |
| 6,625,169 B1 | 9/2003 | Tofano |
| 6,625,650 B2 | 9/2003 | Stelliga |
| 6,631,519 B1 | 10/2003 | Nicholson et al. |
| 6,633,571 B1 | 10/2003 | Sakamoto et al. |
| 6,636,516 B1 | 10/2003 | Yamano |
| 6,639,897 B1 | 10/2003 | Shiomoto et al. |
| 6,640,248 B1 | 10/2003 | Jorgensen |
| 6,654,787 B1 | 11/2003 | Aronson et al. |
| 6,658,013 B1 | 12/2003 | de Boer et al. |
| 6,680,922 B1 | 1/2004 | Jorgensen |
| 6,694,437 B1 | 2/2004 | Pao et al. |
| 6,697,359 B1 | 2/2004 | George |
| 6,697,360 B1 | 2/2004 | Gai et al. |
| 6,701,449 B1 | 3/2004 | Davis et al. |
| 6,732,314 B1 | 5/2004 | Borella et al. |
| 6,738,371 B1 | 5/2004 | Ayres |
| 6,763,236 B2 | 7/2004 | Siren |
| 6,775,267 B1 | 8/2004 | Kung |
| 6,775,284 B1 | 8/2004 | Calvignac et al. |
| 6,785,224 B2 | 8/2004 | Uematsu et al. |
| 6,785,691 B1 | 8/2004 | Hewett et al. |
| 6,807,181 B1 | 10/2004 | Weschler |
| 6,820,210 B1 | 11/2004 | Daruwalla et al. |
| 6,822,958 B1 | 11/2004 | Branth et al. |
| 6,856,676 B1 | 2/2005 | Pirot et al. |
| 6,868,082 B1 | 3/2005 | Allen et al. |
| 6,920,146 B1 | 7/2005 | Johnson et al. |
| 6,920,580 B1 | 7/2005 | Cramer et al. |
| 6,922,774 B2 | 7/2005 | Meushaw et al. |
| 6,938,097 B1 | 8/2005 | Vincent |
| 6,944,128 B2 | 9/2005 | Nichols |
| 6,944,168 B2 | 9/2005 | Paatela et al. |
| 6,954,429 B2 | 10/2005 | Horton et al. |
| 6,959,194 B2 | 10/2005 | Brouwer et al. |
| 6,980,526 B2 | 12/2005 | Jang et al. |
| 6,985,438 B1 | 1/2006 | Tschudin |
| 6,985,956 B2 | 1/2006 | Luke et al. |
| 7,020,143 B2 | 3/2006 | Zdan |
| 7,089,293 B2 | 4/2006 | Grosner et al. |
| 7,042,843 B2 * | 5/2006 | Ni ................... 370/231 |
| 7,042,848 B2 | 5/2006 | Santiago et al. |
| 7,054,311 B2 | 5/2006 | Norman et al. |
| 7,058,716 B1 | 6/2006 | Sundaresan et al. |
| 7,068,656 B2 | 6/2006 | Sainomoto et al. |
| 7,082,477 B1 | 7/2006 | Sadhasivam et al. |
| 7,096,383 B2 | 8/2006 | Talaugon et al. |
| 7,096,495 B1 | 8/2006 | Warrier et al. |
| 7,116,679 B1 | 10/2006 | Ghahremani |
| 7,159,035 B2 | 1/2007 | Garcia-Luna-Aceves et al. |
| 7,161,904 B2 | 1/2007 | Hussain et al. |
| 7,174,372 B1 | 2/2007 | Sarkar |
| 7,187,676 B2 | 3/2007 | DiMambro |
| 7,197,553 B2 | 3/2007 | Roberts et al. |
| 7,225,259 B2 | 5/2007 | Ho et al. |
| 7,243,371 B1 | 7/2007 | Kasper et al. |
| 7,266,120 B2 | 9/2007 | Cheng et al. |
| 7,272,643 B1 | 9/2007 | Sarkar et al. |
| 7,293,355 B2 | 11/2007 | Lauffer |
| 7,313,614 B2 | 12/2007 | Considine et al. |
| 7,463,633 B2 | 12/2008 | Endo et al. |
| 7,499,398 B2 | 3/2009 | Damon et al. |
| 7,522,604 B2 | 4/2009 | Hussain |
| 7,574,495 B1 | 8/2009 | Rajagopalan et al. |
| 7,639,632 B2 | 12/2009 | Sarkar et al. |
| 7,720,053 B2 | 5/2010 | Hussain |
| 7,761,743 B2 | 7/2010 | Talaugon |
| 7,881,244 B2 | 2/2011 | Balay |
| 7,925,920 B2 | 4/2011 | Talaugon |
| 7,933,269 B2 | 4/2011 | Cheng |
| 7,957,407 B2 | 6/2011 | Desai |
| 7,961,615 B2 | 6/2011 | Balay |
| 2001/0024425 A1 | 9/2001 | Tsunoda et al. |
| 2001/0033580 A1 | 10/2001 | Dorsey et al. |
| 2001/0034733 A1 | 10/2001 | Prompt et al. |
| 2001/0043571 A1 | 11/2001 | Kent |
| 2001/0052013 A1 | 12/2001 | Munguia et al. |
| 2002/0023171 A1 | 2/2002 | Garrett et al. |
| 2002/0071389 A1 | 6/2002 | Seo |
| 2002/0075901 A1 | 6/2002 | Perlmutter et al. |
| 2002/0099849 A1 | 7/2002 | Alfieri et al. |
| 2002/0150093 A1 | 10/2002 | Ott et al. |
| 2002/0150114 A1 | 10/2002 | Sainomoto et al. |
| 2002/0152373 A1 | 10/2002 | Sun et al. |
| 2002/0162025 A1 | 10/2002 | Sutton et al. |
| 2002/0186661 A1 | 12/2002 | Santiago et al. |
| 2002/0186667 A1 | 12/2002 | Mor et al. |
| 2003/0012209 A1 | 1/2003 | Abdelilah et al. |
| 2003/0026262 A1 | 2/2003 | Jarl |
| 2003/0033401 A1 | 2/2003 | Poisson et al. |
| 2003/0055920 A1 | 3/2003 | Kakadia et al. |
| 2003/0063590 A1 | 4/2003 | Mohan et al. |
| 2003/0108041 A1 | 6/2003 | Aysan et al. |
| 2003/0112799 A1 | 6/2003 | Chandra et al. |
| 2003/0115308 A1 | 6/2003 | Best et al. |
| 2003/0117954 A1 | 6/2003 | De Neve et al. |
| 2003/0169747 A1 | 9/2003 | Wang |
| 2003/0174650 A1 | 9/2003 | Shankar et al. |
| 2003/0200295 A1 | 10/2003 | Roberts et al. |
| 2003/0212735 A1 | 11/2003 | Hicok et al. |
| 2003/0223406 A1 | 12/2003 | Balay |
| 2004/0019651 A1 | 1/2004 | Andaker |
| 2004/0037279 A1 | 2/2004 | Zeliger |
| 2004/0054886 A1 | 3/2004 | Dickinson et al. |
| 2004/0141521 A1 | 7/2004 | George |
| 2004/0160900 A1 | 8/2004 | Lund et al. |
| 2004/0193922 A1 | 9/2004 | Bandini et al. |
| 2004/0199567 A1 | 10/2004 | Lund |
| 2004/0199568 A1 | 10/2004 | Lund |

| | | |
|---|---|---|
| 2004/0199569 A1 | 10/2004 | Kalkunte et al. |
| 2005/0002417 A1 | 1/2005 | Kelly et al. |
| 2005/0055306 A1 | 3/2005 | Miller et al. |
| 2005/0081059 A1 | 4/2005 | Bandini et al. |
| 2005/0108340 A1 | 5/2005 | Gleeson et al. |
| 2005/0113114 A1 | 5/2005 | Asthana |
| 2005/0163115 A1 | 7/2005 | Dontu et al. |
| 2006/0087969 A1 | 4/2006 | Santiago et al. |
| 2006/0206713 A1 | 9/2006 | Hickman et al. |
| 2007/0147368 A1 | 6/2007 | Desai et al. |
| 2007/0237172 A1 | 10/2007 | Zelig et al. |
| 2008/0028456 A1* | 1/2008 | O'Rourke et al. ............... 726/11 |
| 2008/0259936 A1 | 10/2008 | Hussain et al. |
| 2008/0317040 A1 | 12/2008 | Balay et al. |
| 2008/0317231 A1 | 12/2008 | Balay et al. |
| 2008/0320553 A1 | 12/2008 | Balay et al. |
| 2009/0007228 A1 | 1/2009 | Balay et al. |
| 2009/0046728 A1 | 2/2009 | Matthews |
| 2009/0073977 A1 | 3/2009 | Hussain |
| 2009/0131020 A1 | 5/2009 | van de Groenendaal |
| 2009/0225759 A1 | 9/2009 | Hussain et al. |
| 2009/0238181 A1 | 9/2009 | Desai et al. |
| 2009/0279567 A1 | 11/2009 | Ta et al. |
| 2010/0142527 A1 | 6/2010 | Balay et al. |
| 2010/0146098 A1 | 6/2010 | Ishizakl et al. |
| 2010/0146627 A1 | 6/2010 | Lin |
| 2010/0189016 A1 | 7/2010 | Millet |
| 2010/0220732 A1 | 9/2010 | Hussain et al. |
| 2010/0220741 A1 | 9/2010 | Desai et al. |
| 2011/0122872 A1 | 5/2011 | Balay |

OTHER PUBLICATIONS

Office Action dated Oct. 16, 2007 for U.S. Appl. No. 09/661,130.
Office Action dated Oct. 18, 2007 for U.S. Appl. No. 09/663,483.
IEEE Potentials Publication; "Local Area Networks" Dec. 1995/Jan. 1996; pp. 6. http://www.ece.uc.edu/-paw/potentials/sample.
Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
Non-Final Office Action for U.S. Appl. No. 11/849,352 mailed Jul. 17, 2009.
Non-Final Office Action for U.S. Appl. No. 10/991,970 mailed May 18, 2009.
Non-Final Office Action for U.S. Appl. No. 11/849,352 mailed Jul. 17, 2009.
Non-Final Office Action for U.S. Appl. No. 10/991,970 mailed May 18, 2009.
Non-Final Office Action for U.S. Appl. No. 10/991,969 mailed Apr. 27, 2009.
Non-Final Office Action for U.S. Appl. No. 11/684,614 mailed Apr. 24, 2009.
Non-Final Office Action for U.S. Appl. No. 10/991,969 mailed Apr. 27, 2009.
Non-Final Office Action for U.S. Appl. No. 11/684,614 mailed Apr. 24, 2009.
Final Rejection for U.S. Appl. No. 11/537,609 mailed Nov. 17, 2009.
Final Rejection for U.S. Appl. No. 11/530,901 mailed Sep. 1, 2009.
Final Rejection for U.S. Appl. No. 11/616,243 mailed Sep. 15, 2009.
Non-Final Rejection for U.S. Appl. No. 12/123,443 mailed Jan. 27, 2010.
Non-Final Rejection for U.S. Appl. No. 10/991,970 mailed Jan. 12, 2010.
Non-Final Rejection for U.S. Appl. No. 10/991,970 mailed Dec. 31, 2009.
Non-Final Rejection for U.S. Appl. No. 12/637,140, mailed Sep. 17, 2010.
Non-Final Rejection for U.S. Appl. No. 12/537,898, mailed Sep. 9, 2010.
Final Rejection for U.S. Appl. No. 12/202,223, mailed Sep. 16, 2010.
Non-Final Rejection for U.S. Appl. No. 12/202,233 mailed Jun. 21, 2010.
Non-Final Rejection for U.S. Appl. No. 11/460,977, mailed Jul. 2, 2010.
Non-Final Rejection for U.S. Appl. No. 12/477,124 mailed May 23, 2011.
Tsiang et al. "RFC 2892, The Cisco SRP MAC Layer Protocol." Aug. 2000, pp. 1-52.
Zhang et al. "Token Ring Arbitration Circuits for Dynamic Priority Algorithms" IEEE, 1995, pp. 74-77.
Non-Final Office Action for U.S. Appl. No. 11/537,609, Mailed Apr. 1, 2009.
Non-Final Office Action for U.S. Appl. No. 11/621,102 mailed Mar. 30, 2009.
Non-Final Office Action for U.S. Appl. No. 11/616,243 mailed Mar. 3, 2009.
Final Office Action for U.S. Appl. No. 09/952,520 mailed Feb. 11, 2009.
Final Office Action for U.S. Appl. No. 09/663,457 mailed Feb. 3, 2009.
Non-Final Office Action for U.S. Appl. No. 11/530,901 mailed Jan. 26, 2009.
Chan, Mun C. et al., "An architecture for broadband virtual networks under customer control." IEEE Network Operations and Management Symposium. Apr. 1996. pp. 135-144.
Chan, Mun C. et al "Customer Management and Control of Broadband VPN Services." Proc. Fifth IFIP/IEEE International Symposium of Integrated Network Management. May 1997. pp. 301-314.
Gasparro, D.M., "Next-Gen VPNs: The Design Challenge." Data Communications. Sep. 1999. pp. 83-95.
Hanaki, M. et al., "LAN/WAN management integration using ATM CNM interface." IEEE Network Operations Management Symposium, vol. 1. Apr. 1996. pp. 12-21.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.
Rao, J.R., Intranets and VPNs: Strategic Approach. 1988 Annual Review of Communications. 1998. pp. 669-674.
Tanenbaum, A.S., "Computer Networks." Upper Saddle River, N. J.: Prentice Hall PTR, 3rd Edition. 1996. pp. 348-364.
European Search Report for PCT/US03/37009 (Jul. 4, 2004) 2 pgs.
International Search Report for PCTUS03/17674. 6 pgs, 2003.

* cited by examiner

ROUTING TRAFFIC THROUGH A VIRTUAL ROUTER-BASED NETWORK SWITCH

CROSS-REFERENCE TO RELATED APPLICATIONS

This application is a continuation of U.S. application Ser. No. 11/671,462 filed on Feb. 5, 2007, which is a continuation of U.S. application Ser. No. 10/163,079 filed on Jun. 4, 2002, both of which are hereby incorporated by reference for all purposes.

This application is also related to the following US patents and US patent applications, all of which are incorporated herein by reference in their entireties for all purposes:

U.S. Pat. No. 7,161,904, entitled, "SYSTEM AND METHOD FOR HIERARCHICAL METERING IN A VIRTUAL ROUTER BASED NETWORK SWITCH;"

Application Ser. No. 10/163,261, entitled, "NETWORK PACKET STEERING;"

U.S. Pat. No. 7,116,665, entitled, "METHODS AND SYSTEMS FOR A DISTRIBUTED PROVIDER EDGE;"

Application Ser. No. 10/163,071, entitled, "SYSTEM AND METHOD FOR CONTROLLING ROUTING IN A VIRTUAL ROUTER SYSTEM;" and Application Ser. No. 10/163,260, entitled, "SERVICE PROCESSING SWITCH"

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2002-2008, Fortinet, Inc.

BACKGROUND

1. Field

Embodiments of the present invention generally relate to high performance network switches, and more particularly to routing traffic through a virtual router-based network switch.

2. Description of the Related Art

The use of networks, including LANs, WANs and the Internet continues to grow at ever increasing rates. Each day, more and more systems are becoming interconnected. This has created a need for high performance network switches on the part of network service providers. Many of the switches comprise multiple modules with many data flows between the modules themselves and between the interfaces to external networks. In some cases, these modules, including the processors residing on the modules can be partitioned into virtual routers, such as software running on the processors that emulates the functioning of an individual physical router. As a result of the combination of hundreds of thousands of data flows for the virtual routers in these network switches, there is a need for efficiently processing packet flows and for controlling the resources consumed within the network switch.

SUMMARY

Methods and systems are described for routing traffic through a virtual router-based network switch. According to one embodiment, a flow data structure is established that identifies current packet flows associated with multiple virtual routers in a virtual router-based network device. An incoming packet is received by the virtual router-based network device. It is then determined whether the incoming packet is associated with a current packet flow by accessing the flow data structure based on a header associated with the incoming packet. If it is determined that the incoming packet is associated with the current packet flow, then the incoming packet is hardware forwarded via a network interface of the virtual router-based network device without intervention by a processor of the virtual router-based network device, otherwise the incoming packet is forwarded to software on the processor for flow learning.

According to another embodiment, a method is provided for validating micro-flows. A hardware accelerated micro-flow is established by configuring forwarding state information of a flow cache entry associated with the hardware accelerated micro-flow. The hardware accelerated micro-flow includes an identifier and an invalidation tag. Upon receiving an incoming packet that is part of the hardware accelerated micro-flow, the invalidation tag is compared to a value in an invalid tag table located by the identifier. The hardware accelerated micro-flow is invalidated when the value does not match the invalidation tag.

According to another embodiment, a method is provided for capping packet flow. A rate metering structure is associated with each of multiple micro-flows of a virtual router-based network device. A corresponding rate statistic is maintained for each micro-flow in the rate metering structures. Upon detecting that the corresponding rate statistic is exceeded for a micro-flow with which an incoming packet is associated, dropping the incoming packet.

According to another embodiment, a method is provided for limiting resource consumption in a virtual router-based network device. A flow metering structure is associated with a virtual router. Upon detecting a packet flow is to be assigned to the virtual router, a flow counter in the flow metering structure is incremented. The flow counter is then compared to a predetermined limit value and if the flow counter does not exceed the predetermined limit value then establishing the packet flow, otherwise refusing to establish the packet flow.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
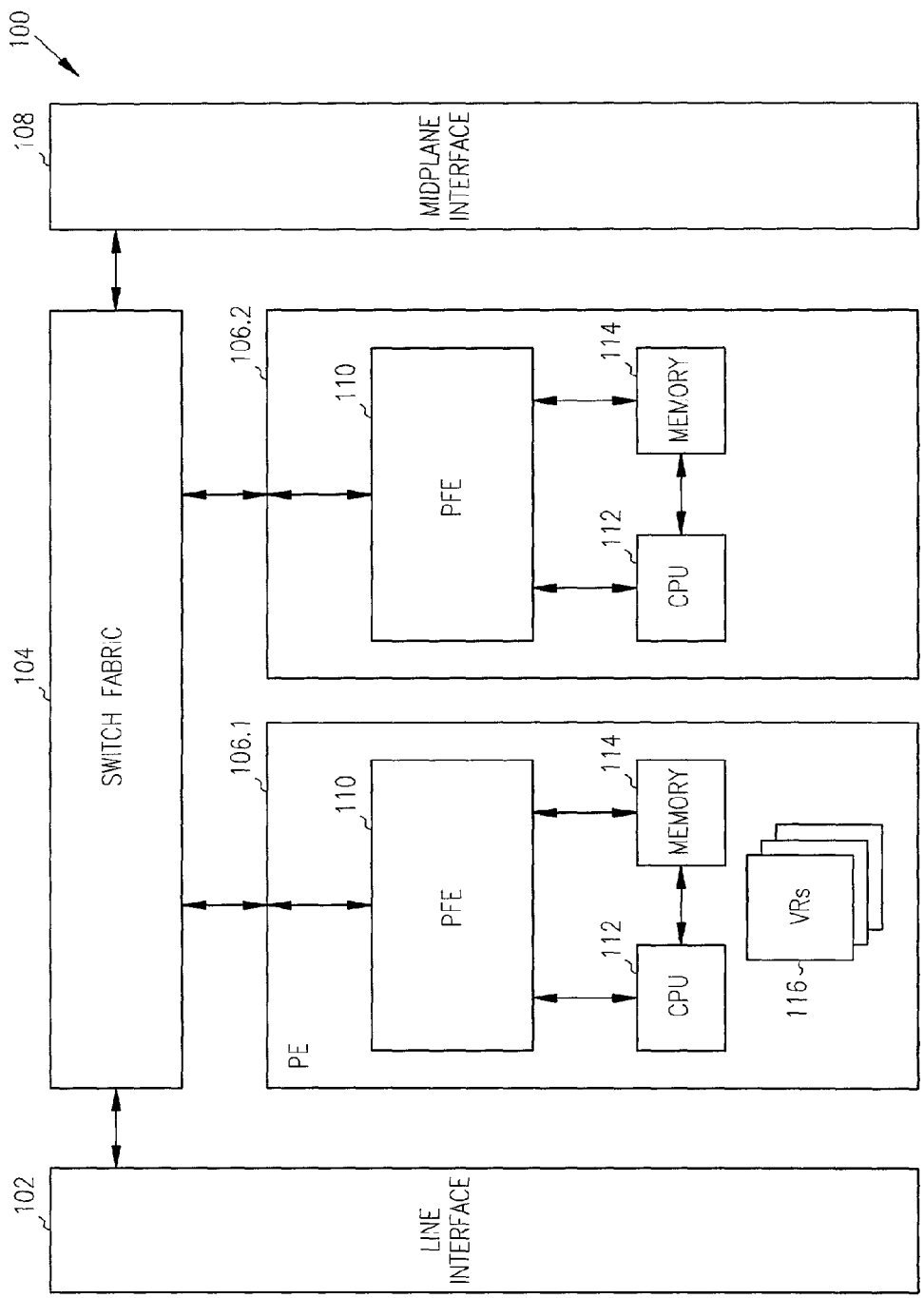
FIG. 1 is a block diagram of a virtual router hardware and operating environment in which various embodiments of the present invention may be practiced.

Methods and systems are described for routing traffic through a virtual router-based network switch. In the following detailed description of exemplary embodiments of the invention, reference is made to the accompanying drawings, which form a part hereof, and in which is show by way of illustration specific exemplary embodiments in which the invention may be practices. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed description which follows are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and/or otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system or similar computing device that manipulates and transforms data represented as physical (e.g., electronic) quantities within the computer system's registers and memories into other data similarly represented as physical quantities within the computer system memories or registers or other such information storage, transmission or display devices.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Abbreviations

The following abbreviations may be used in the detailed description that follows. If an abbreviation is used that does not appear in the list, the meaning as used by one of skill in the art is intended.

API Application Programming Interface
DB Database
CBR Control Blade Redundancy
CEP Connection End Point
CM Configuration Manager (CLI or SNMP)
DML Distributed Messaging Layer
IOCTL Input Output Control
IPNOS IP Network Operating System
IPSX IP Service exchange
LQ Logical Queue
OM Object Manager
OMCD Object Manager Configuration Database
OMORI Object Manager Object Routing and Interface
OMORIG Object Manager Object Routing and Interface Global
OS Operating System
RLS Resource Location Service
RM Resource Manager
VI Virtual Interface
VPN Virtual Private Network
VR Virtual Router Operating Environment FIG. 1 illustrates a router operating environment 100 used in some embodiments of the present invention. Environment 100 includes an external network interface 102, a midplane interface 108 and at least one processing element 106 all communicably coupled through an internal network interface 104. In some embodiments, midplane interface 108 connects environment 100 to a midplane capable of interconnecting a plurality of environments 100 in a service module or a cabinet.

In one embodiment of the present invention, external network interface 102 is referred to as a line interface, and provides a media access interface to wired or wireless network. Examples of such line interfaces include Gigabit Ethernet, OC-12/STM-4 POS, OC-3/STM-1 POS and DS3C/DS3U/E3U interfaces. The invention is not limited to any particular type of line interface or network type.

In some embodiments, internal network interface 104 is a switch fabric interface. In one embodiment, the switch fabric interface is a 51.2 Gbps, 8-port, fully meshed, non-blocking switch fabric, with each port supporting a 6.4 Gpbs transfer rate. However, the invention is not limited to any particular type of switch interface or internal network interface 104.

In some embodiments, processing engines 106 provide specialized application processing within environment 100. In some embodiments, processing engine 106 can be a Virtual Routing Engine (VRE) capable of providing virtual router applications 116. In alternative embodiments, processing engine 106 can be a Virtual Service Engine (VSE) capable of providing services, such as firewall services and antivirus services. In further alternative embodiments, processing engine 106 can be an Advances Security Engine capable of providing data encryption services.

Processing engine 106, in some embodiments, includes a Packet Forwarding Engine (PFE) 110, processor 112 and memory 114. Processor 112 executes computerized instructions that form the various types of applications that can be run on a processing engine 106. In one embodiment of the present invention, processor 112 is a PowerPC 750CX from IBM Corp. In an alternative embodiment, processor 112 is a Hi/fn 7851. In a further alternative embodiment, processor 112 is a Hi/fn 6500. The invention is not limited to any particular type of processor. Additionally, in some embodiments of the present invention, processing engine 106 includes more than one processor 112. The invention is not limited to any particular number of processors 112.

PFE 110, in some embodiments, comprises circuits and logic that perform hardware assisted packet routing for a processing engine 106. In general, PFE 110 analyzes packets that arrive from the internal network interface or from a DMA interface with processor 112. PFE 110 then determines whether the packet can be hardware forwarded without the intervention of processor 112 or whether such intervention is required. Further details on the structure of PFE 110 and methods implemented within PFE 110 will be provided below.

Memory 114 is a memory capable of storing data and instructions for processor 112 and PFE 110. In some embodiments, processor 112 and PFE 110 share memory 114. In alternative embodiments, each of processor 112 and PFE 110 has dedicated memory.

Figure 2:
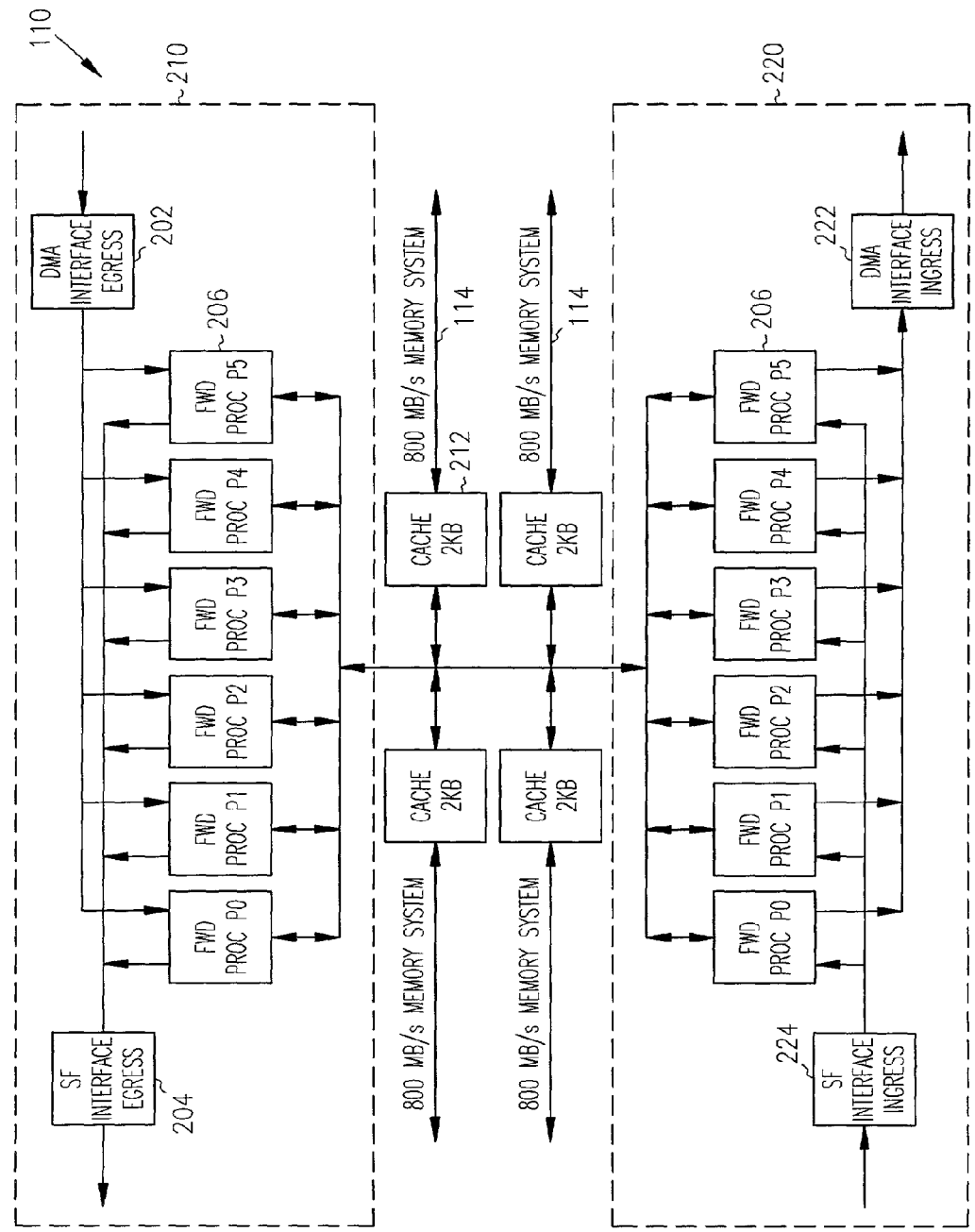
FIG. 2 is a diagram providing further details of a packet forwarding engine environment according to one embodiment of the present invention.

FIG. 2 illustrates further details on a PFE 110 according to various embodiments of the present invention. In some embodiments, PFE 110 is partitioned into an ingress unit 220 and egress module 210. In some embodiments, the PFE ingress unit 220 includes a switch fabric interface ingress 224 that processes incoming packets from the internal network interface 104 and transfers them to the DMA Engine ingress 222. The PFE egress unit 210 processes outgoing packets from the DMA Engine egress 202 and transfers them to the internal network 104 using a switch fabric egress module 204. In some embodiments, both the ingress and egress units have direct access to the PE memory system 114 (FIG. 1). Further in some embodiments, the PFE 110 operates synchronously to the processor 112 interface and memory system 114 at 100 MHz.

In some embodiments, both the PFE ingress and egress units comprise an array of 32-bit packet processors 206 that share an on-chip write-back cache 212. In some embodiments, each ingress unit 220 and egress unit 210 include six packet processors 206. However, the invention is not limited to any particular number of packet processors. In one embodiment, the packet processor implements a RISC-like integer instruction set with special instructions for bit field extraction and merging and for unaligned block data transfers. According to one embodiment, each packet processor 206 operates on a different packet and hardware interlocks maintain packet order. In some embodiments, the ingress processors share common micro-code for ingress processing and the egress processors share common micro-code for egress processing. In some embodiments, the PFE 110 memory maps the ingress and egress instruction stores and supports micro-code updates through Programmed Input/Output (PIO) write transactions.

In operation, the PFE ingress unit 220 passes forwarding state to the DMA Engine 202 that incorporates this state into a packet receive descriptor. This forwarding state indicates whether the processor 112 should software forward the packet or the packet may bypass the processor and the PFE 110 can hardware forward the packet. In some embodiments, the forwarding state also includes a 20-bit index into a forwarding transform cache that describes PFE processing per packet flow. For software forwarding packets, a receive descriptor is pushed onto the DMA ingress descriptor queue. For hardware forwarded packets, the descriptor will bypass the DMA ingress queue and be pushed directly onto the DMA egress descriptor queue as a transmit descriptor.

FIGS. 3-6 are flowcharts illustrating methods for providing hardware accelerated packet routing and for controlling resources related to such hardware accelerated packet routing. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 3-6 are inclusive of the acts required to be taken by an operating environment executing an exemplary embodiment of the present invention.

Figure 3:
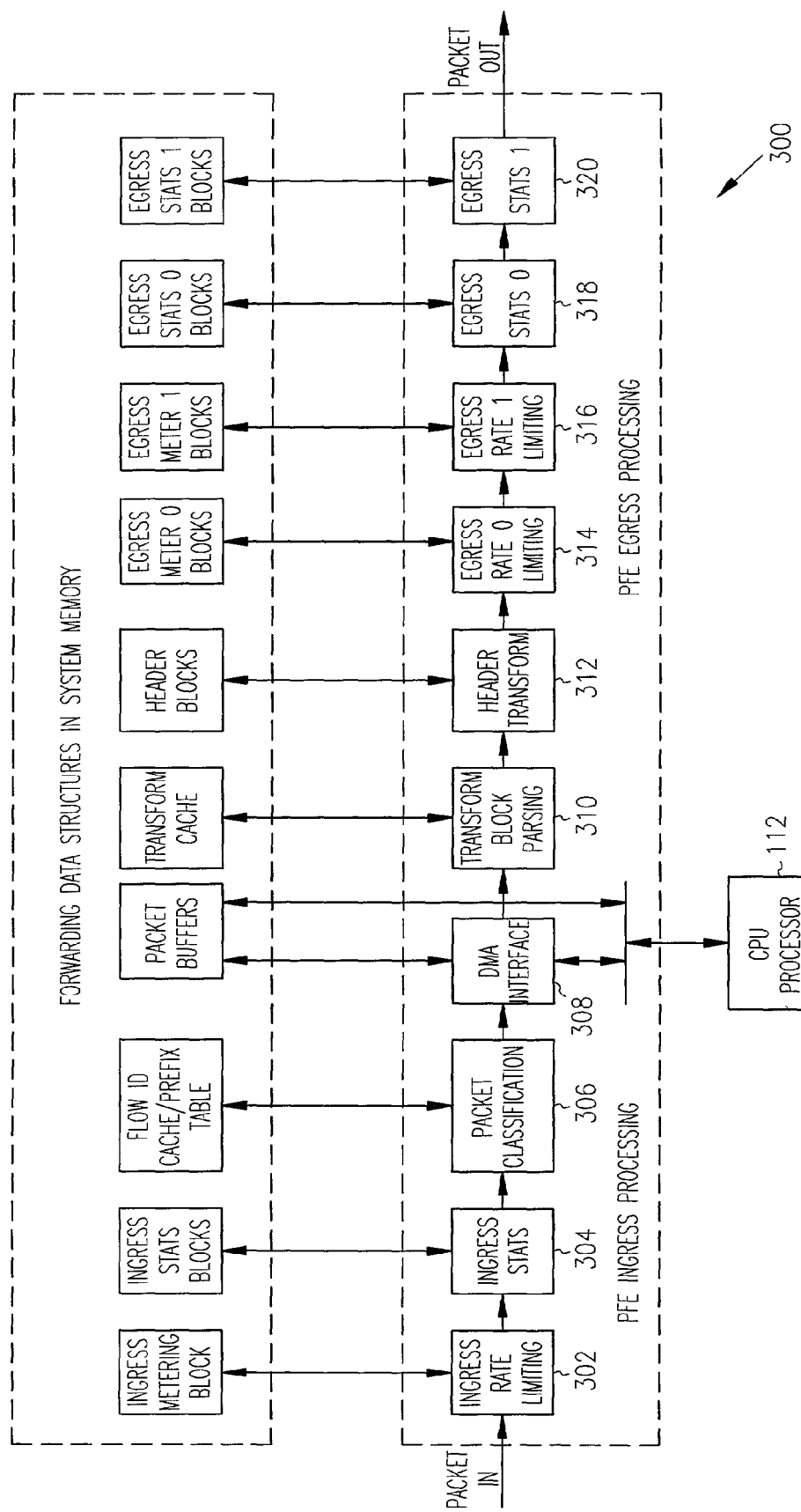
FIG. 3 is a flowchart illustrating a method for routing packets using hardware acceleration according to one embodiment of the present invention.

FIG. 3 illustrates a method for performing packet forwarding using hardware packet acceleration. The method is invoked when a packet is received by a packet processor, such as packet processor 206. In some embodiments, the method begins by performing ingress rate limiting (block 302). Further details on rate limiting will be provided below. Next, ingress statistics are updated (block 304).

Next, in some embodiments of the present invention, the packet is classified (block 306). Packet classification involves looking at one or more of the various protocol layer headers. As those skilled in the art will appreciate, packets are typically encapsulated with various protocol headers that define sources, destinations and applications that are to process the data in the packet. For example, layer 2 (L2) is typically a data link layer that specifies the organization of data into frames and how to send frames over a network; layer 3 (L3) is a network layer that specifies addressing assignments and how packets are forwarded and layer 4 (L4) is a transport layer that specifies how to reliably handle data transfer. For example TCP/IP occupies L3 and L4 in this reference model. In some embodiments, layer 1 (L1, also referred to as LQ) includes a header that specifies an LQ ID and LQ protocol to use to route packets internally within a router. The LQ ID is used to identify a particular VR that is to receive the packet.

In some embodiments, the PFE ingress unit supports two basic forms of packet classification. One is flow-based, using various fields of the LQ header along with fields in the L3/L4 headers to identify a particular VR flow (also referred to as a micro-flow). The other form uses the upper bits of the IP address or MPLS label to index a table of flow indices. According to one embodiment, the host software controls which classification form the PFE uses by programming different micro-code into the ingress instruction store. In one embodiment, in both forms of packet classification, the classification result is a 20-bit forwarding index that the hardware uses to select the correct packet transformation.

Each flow ID cache entry stores the LQ ID, LQ protocol, L3, and L4 fields that identify a particular VR flow along with state indicating whether to hardware or software forwarding packets belonging to the micro-flow. The PFE ingress unit generates an index into the flow ID cache by hashing the incoming packet's LQ ID, LQ protocol, L3, and L4 header fields. It then looks-up the indexed cache entry and compares the packet micro-flow ID fields to the cached micro-flow ID fields. On a cache hit, the FwdAction field of the cache entry indicates whether to software or hardware forward the packet. On a cache miss, the ingress controller allocates a cache entry and forwards the packet to software on processor 112 for flow learning.

TABLE 1

Flow ID Cache Block

| Word | Bits | Name | Description |
|---|---|---|---|
| 0 | 31 | Valid | Indicates the flow ID block ID is valid. |
| | 30:29 | FwdAction | Indicates forwarding action: 0: Pending 1: Software forward |

TABLE 1-continued

Flow ID Cache Block

| Word | Bits | Name | Description |
|---|---|---|---|
| | | | 2: Hardware forward |
| | | | 3: Hardware forward SPF |
| | 28 | Reserved | |
| | 27 | AgeEnable | Enable for Flow Aging |
| | 26 | Reserved | |
| | 25:16 | VRGroupID | The VR invalidation group ID. The hardware uses this ID to select an entry in the Invalidation Tag table to determine if this FCB should be invalidated |
| | 15:0 | FlowAgeTime | Software uses this field to set the flow lifetime in seconds. Hardware translates the flow lifetime into an expiration timestamp after which the flow will become invalid |
| 1 | 31:16 | PendingTag | The tag uniquely identifies a flow from other flows which have resided in the same FCB. The tag is incremented each time the FCB is replaced by a new flow. One new flow and HW packets the SrcChan in the SF header is replaced with the tag. The tag in the FCB is compared with the tag in a FCB_UPDATE message. The tags must match for the PFE to accept the update. |
| | 15:0 | VRInvTag | This field holds the VR group invalidation tag that was current at the time the FCB update message was received. |
| 2 | 31:24 | FlowCapTag | Used to determine if this flow has been counted for the current interval in flow cap processing. |
| | 23:16 | LQ_PROTO | LQ protocol ID field |
| | 15:0 | LQ_ID | Destination LQID field |
| 3 | 31:0 | L3 | L3 header fields required for flow classification |
| 4 | 31:0 | | |
| 5 | 31:0 | | MPLS {Label, Exp} IP {Protocol, TOS, Src Addr, Dst Addr} |
| 6 | 31:0 | L4 | L4 header fields required for flow classification TCP/UDP {src Port, Dst Port} IPSec {SPI} |
| 7 | 31:0 | L2 | PPP {Protocol}, L2TP {Tunnel ID, Session ID} |

TABLE 2

Flow ID L3 Formats

| Word | Bits | Name | Description |
|---|---|---|---|
| | | MPLS | |
| 3 | 31:24 | Reserved | |
| | 23:4 | Label | MPLS Label field |
| | 3:1 | Exp | MPLS Exp field |
| | 0 | Stack | MPLS Stack field |
| 4 | 31:0 | Reserved | |
| 5 | 31:0 | Reserved | |
| | | IPv4 | |
| 3 | 31:16 | Reserved | |
| | 215:8 | Proto | IP header protocol field |
| | 7:0 | TOS | IP header TOS field |
| 4 | 31:0 | Src | IP header source address field |
| 5 | 31:0 | Dst | IP header destination address field |

TABLE 3

Flow ID L4 Formats

| Word | Bits | Name | Description |
|---|---|---|---|
| | | TCP/UDP | |
| 6 | 31:16 | Src | TCP/UDP header source port field |
| | 15:0 | Dst | TCP/UDP header destination port field |
| | | IPSec | |
| 6 | 31:0 | SPI | IPSec AH or EPS header SPI field |

TABLE 4

L2 Tunnel/Detunnel formats

| Word | Bits | Name | Description |
|---|---|---|---|
| | | PPP | |
| 7 | 31:8 | Reserved | |
| | 7:0 | Protocol | PPP header protocol field |
| | | L2TP (LNS) | |
| 3 | 31:16 | Reserved | |
| | 15:8 | Proto | Encapsulated IP header protocol field |
| | 7:0 | TOS | Encapsulated IP header TOS field |
| 4 | 31:0 | Src | Encapsulated IP header source address field |
| 5 | 31:0 | Dst | Encapsulated IP header destination address field |
| 6 | 31:16 | Src | Encapsulated TCP/UDP source port. Reserved if IP proto != TCP or UDP |
| | 15:0 | Dst | Encapsulated TCP/UDP destination port. Reserved if IP proto != TCP or UDP |
| 7 | 31:16 | Tunnel ID | L2TP header Tunnel identification field. |
| | 15:0 | Session ID | L2TP header Session identification field |
| | | L2TP (LAC) | |
| 7 | 31:16 | Tunnel ID | L2TP header Tunnel identification field. |
| | 15:0 | Session ID | L2TP header Session identification field |

According to one embodiment, when the PFE controller detects a new flow, it attempts to allocate one of four FCBs selected using its hashed flow index. If the PFE finds an available FCB, it replaces the FCB tag fields, sets the FwdAction field to pending and increments the FCB pending tag. The PFE then forwards the packet to software using a descriptor marking of FWD_NEW. At some later time, the host software sends a control packet containing an FCB_UPDATE message for this flow, which sets up the FCB.

According to one embodiment, if the PFE is unable to allocate an FCB, it forwards the packet to software using a descriptor marking of FWD_COLLISION. This indicates to software that the packet's flow collided with another currently active flow in the FCB cache.

In one embodiment, during the time between the first packet's arrival and the arrival of the FCB_UPDATE message for that flow, the PFE forwards all packets of that flow to software marked with a FWD_NEW descriptor. In the case that another new flow replaces the FCB before an FCB_UPDATE message arrives, the PFE uses the FCB's Pending Tag field to uniquely identify the flow for the FCB_UPDATE messages.

According to one embodiment, for each new flow, the PFE ingress controller replaces the FCB flow tag fields and increments the pending tag. Upon the arrival of an FCB_UPDATE message the PFE compares the pending tag in the FCB and the message, and if they are equal accepts the message. If the pending tags differ when the FCB_UPDATE message arrives, the PFE ignores the update message. In this way, the PFE ignores stale FCB update message.

If the packet can be hardware forwarded, the packet processor then performs transform block processing (block 310). The PFE maintains a table of Transform Control Blocks (TCBs), which direct how the egress controller processes outgoing-packets. The egress controller uses the 20-bit forwarding index, carried by the DMA descriptor, to select a transform control block from the table before processing packets. In one embodiment, each transform control block entry contains 64-bytes formatted as described in the table below.

TABLE 5

Transform Control Block

| Word | Bits | Name | Description |
|---|---|---|---|
| 1 | 31 | NAT_IP | Perform NAT on IP addresses. |
| | 30 | DropCpuPkt | If this bit is set and the Pkt desc is HW_COH the packet is dropped |
| | 29 | NAT_TCP | Perform NAT on TCP/UDP port addresses |
| | 28 | ReplaceRM | Replace Rate-Marking field in SF header. |
| | 27 | ReplaceID | Replace IP header ID field with incremented PktID. |
| | 26 | ValidCRC | Validate IP header checksum. |
| | 25 | DecrTTL | Decrement the IP or MPLS header TTL value |
| | 24 | ReplacePRI | Replace Priority field in SF header. |
| | 23:16 | TOS/EXP | IP TOS/MPLS EXP replacement value |
| | 15:8 | TOS/EXP Enables | Enables for IP TOS/MPLS EXP replacement. (Set high for replace bit) |
| | 7:4 | MPLS Operation | MPLS Operation Code 0: NOP 1: PUSH 2: POP_PEEK 3: POP_FWD 4: SWAP 5: POP_L2VPN_NULL 6: POP_L2VPN_CTRL |
| | 3 | PWE3 Enable | PWE3 special case handling of L2 packets |
| | 2 | PWE3 Control | PWE3 control word should be added. Used when CW is "optional." |
| | 1:0 | Reserved | |
| 2 | 31:0 | StatsOutPtr0 | Memory pointer to egress statistics block 0. |
| 3 | 31:0 | StatsOutPtr1 | Memory pointer to egress statistics block 1 (always assumed enabled). |
| 4 | 31:16 | HdrOffset | Indicates the number of bytes before the start of payload when an application specific header is located. Used for PPPoE. Also used for detunneling, indicates the number of bytes to strip before detunneling. |
| | 15:0 | HdrLen | Byte length of the transform header. |
| 4 | 31:0 | Src | Encapsulated IP header source address field |
| 5 | 31:0 | HdrPtr | Memory pointer to the transform header data |
| 6 | 31:0 | NAT.IPSrc | IP source address NAT replacement value |
| 7 | 31:0 | NAT.IPDst | IP destination address NAT replacement value |

TABLE 5-continued

Transform Control Block

| Word | Bits | Name | Description |
|---|---|---|---|
| 8 | 31:16 | NAT.TCPSrc | TCP/UDP source port NAT replacement value |
| | 15:0 | NAT.TCPDst | TCP/UDP destination port NAT replacement value |
| 9 | 31:0 | PktIdPtr | Memory pointer to packet ID value |
| 10 | 31:0 | MeterOutPtr0 | Memory pointer to egress metering control block 0. |
| 11 | 31:0 | MeterOutPtr1 | Memory pointer to egress metering control block 1. |
| 12 | 31:8 | Reserved | |
| | 7:0 | EgressQosIndex | Mode and memory pointer to the egress QoS translation table |
| 13 | 31:0 | L3HeaderPtr | Memory pointer to the L3 encapsulation header. |
| 14 | 31:0 | L3HeaderSize | Size of the L3 encapsulation header. |
| 15 | 31:16 | FCBTag | The value of the corresponding FCB pending tag must be written here to associate the TCB with the flow. A value of 0 needs to be written in prefix mode. |
| | 15:0 | TCPChkAdj | TCP Checksum adjustment for TCP transforms. |

According to one embodiment, to update a Transform Control Block (TCB), host software sends a control packet containing a PFE_EGRESS_WR message with an address parameter that points to the new TCB. Software should issue the TCB update control packet before issuing the packet being forwarded. This ensures that the forwarded packet is processed according to the updated TCB.

In some embodiments, several fields may be used to maintain packet order and associate the TCB with a specific flow. In flow mode, where several NEW packets for a flow could be sent to the CPU, there is a danger that once the CPU updates the TCB and FCB a packet could be hardware forwarded while the CPU still has packets for that flow. In one embodiment, packet order is enforced by the TCB. When the TCB is written the DropCpuPkt bit should be zero, this will allow the CPU to send the NEW packets it has for that flow. However, when the first FWD_HW packet is seen with this bit clear, the packet forwarding engine (e.g., packet forwarding engine 110) will update the TCB and set this bit. Subsequent packets from the CPU (recognized because they are marked FWD_HW_COH) will be dropped. In alternative embodiments, packet order may be maintained by a conflict cache in the DMA engine.

There is also a consistency check performed between the FCB and the TCB. On ingress the SF header, SrcChan is replaced with the PendingTag field of the FCB, on egress, the SrcChan is compared against the FCBTag field of the TCB. If the tags mismatch, the packet is dropped. For prefix mode, the SrcChan is replaced with zero and the FCBTag field is initialized to zero.

Next, a packet processor executing the method performs header transformation (block 312). In its simplest form, the packet header transformation involves the replacement of some number of header bytes of an ingress packet with some number of bytes of replacement header data. Under the control of a TCB, the PFE egress unit can selectively replace and recompute specific fields in a small set of protocol headers.

The PFE egress unit begins the header transform by stripping the incoming packet's SF header along with the number of bytes indicated by the SF header offset field. At that point, the controller will begin copying bytes from the buffer pointed to by the TCB's HdrPtr field into the egress packet buffer. The PFE will copy the number of new header bytes defined by the TCB's Hdrlen field.

After performing this header replacement, the PFE then goes through the TCB enable bits to determine what other header transformations need to be made.

Next, egress rate limiting is performed (blocks 314, 316). Further details on rate limiting are presented below.

Finally, egress statistics are updated (blocks 318, 320) and the method returns to block 302 to await reception of another packet.

Figure 4:
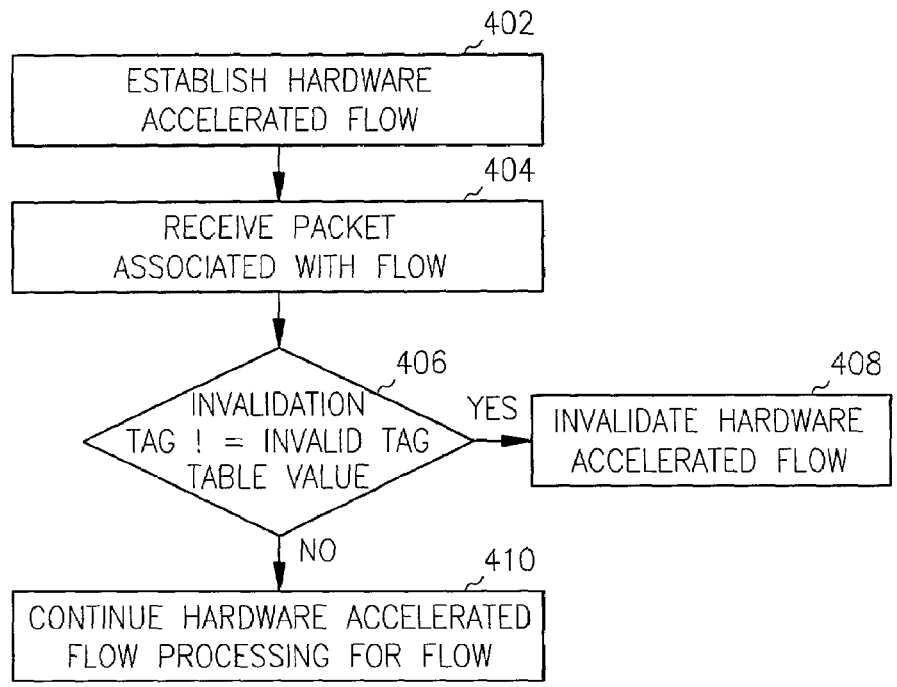
FIG. 4 is a flowchart illustrating a method for invalidating a hardware accelerated packet flow according to one embodiment of the present invention.

FIG. 4 is a flow chart illustrating a method for invalidating a hardware accelerated packet flow according to one embodiment of the present invention. The method begins by establishing a packet flow for a virtual router (block 402). The establishment of a packet flow has been described above with reference to FIG. 3.

Next, the method receives a packet associated with the flow (block 404). Upon receiving a packet, the method determines if the flow should be invalidated or not (block 406). In some embodiments of the present invention, a flow cache block (FCB) describing the flow maintains a VR Group ID value. This value is compared to a tag entry in a VR group invalidation table. If the values are different, the flow is invalid and is marked as such (block 408). The packet may be dropped or it may be forwarded to software running on processor 112 for reestablishment of a flow or other processing. Otherwise, the flow is valid and hardware acceleration continues for the packet (block 410).

In some embodiments, the VR group invalidation is typically incremented (thereby causing the FCB value and the VR group invalidation table value to differ) upon the occurrence of one of several events. One event is flow expiration. In some embodiments a PFE ingress controller applies a flow expiration timestamp to each new flow at the time software establishes the flow. Software defines the flow lifetime by setting the FCB FlowAgeTime field with the number of seconds the flow should remain active. The FCB AgeEnable field is also set for flow aging to be applied.

When a packet arrives for a valid flow, the PFE ingress controller compares the incoming packet's assigned timestamp with the FCB expiration timestamp. If the packet's timestamp exceeds the flow's expiration timestamp, then the PFE will invalidate the flow and send the packet to software with FwdCtl–FWD_New.

In addition to flow aging, the PFE microcode may support a software-initiated flow invalidation scheme. According to one embodiment, at the time software establishes a new flow with an FCB_UPDATE, it assigns the flow to one of 1024 VR invalidation groups by setting the FCB VRGroupID field. The PFE maintains an invalidation tag for each of the VR groups in a table, during the FCB_UPDATE the PFE copies the associated invalidation tag from the table and stores it into the new flow's FCB. Each time a packet arrives for the flow, the PFE ingress controller compares the FCB invalidation tag with the tag value in the associated invalidation table entry. If the PFE detects that an invalidation event has occurred for that flow, then the flow is re-established as a new flow. Software can invalidate all member flows of a VR group by changing the value of the invalidation tag in memory with a MEM_WR command to the appropriate address.

In some embodiments, VR Group index 0 is reserved for pending flows and the tag value in the invalidation table must be zero.

TABLE 6

VR Group Invalidation Tag Entry Format

| Word | Bits | Name | Description |
| --- | --- | --- | --- |
| 0 | 31:16 | Reserved | |
| | 15:0 | VRInvTag | VR group invalidation tag. |
| 1 | 31:0 | Reserved | |

Additionally, in some embodiments, when software sets the FCB's FlowAction field to hardware forward SPF, the PFE performs special TCP header checks before hardware forwarding packets in this flow. If the PFE detects SYN, FIN or RST flags set, then it pushes the packet to software for SPF state machine processing. Also, a FIN or RST flag will automatically invalidate the FCB for subsequent packets.

Figure 5:
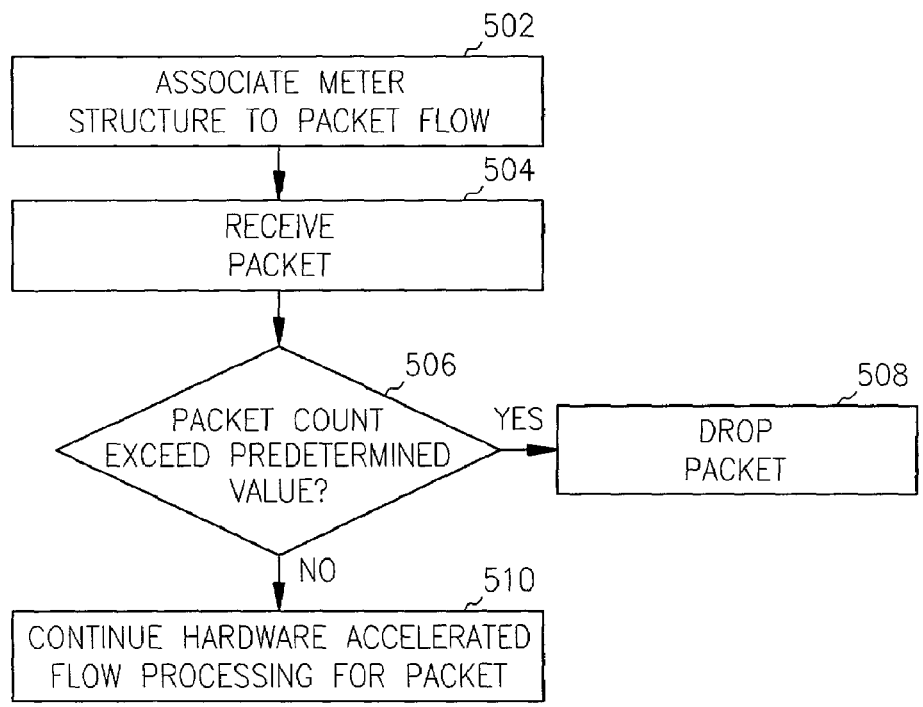
FIG. 5 is a flowchart illustrating a method for packet flow capping according to one embodiment of the present invention.

FIG. 5 is a flowchart illustrating a method for packet flow capping according to one embodiment of the present invention. The method begins by associating a meter structure to a packet flow (block 502). The meter structure may contain various statistics associated with the flow, including packet counts for a time interval. Next, a system executing the method receives a packet (block 504). In response, a packet counter in the meter structure is incremented.

Next, the packet count is compared to a predetermined maximum value to determine if the flow has exceeded the allowable packet count (block 506). If the maximum count is exceeded, the packet can be dropped (block 508). Otherwise, the packet can be processed as part of the normal hardware accelerated flow (block 510).

In some embodiments, the PFE egress unit independently rate limits ingress and egress packets, if enabled. As part of rate limiting, the PFE meters, marks and drops packets. The PFE performs ingress rate limiting before header transformation and performs egress rate limiting after header transformation. Software controls metering and rate marking using a combination of Metering Control Blocks (MCBs) and fields in the TCB and ingress statistics blocks.

In some embodiments, the PFE implements both ingress and egress rate metering and marking according to the two-rate three color marker (trTCM) definition in RFC 2698. Per this definition, in color-blind mode, the PFE marks the drop precedence color of a packet a Green if it does not exceed the CBS, Yellow if it exceeds the CBS but not the PBS, and Red if it exceeds both the CBS and PBS. The packet's color is encoded into the rm field of the LQ header. The PFE increments the C and P buckets by the CIR and PIR values, respectively, in 1 ms intervals.

The PFE egress unit may optionally drop Yellow or Red packets or may color packets for a downstream dropper. The RateInCtl and RateOutCtl fields of the TCB control whether and how to drop packets on ingress and egress rate limiting.

A set of Metering Control Blocks (MCBs) maintained in system memory contain per flow (VR, VI or ACL) trTCM parameters. Table 7 defines the MCB data structure according to one embodiment of the present invention. Hardware provides three logical metering units: VI-based ingress metering, flow-based ingress metering and flow-based egress metering. The TCB contains two MCB pointers for flow-based metering. The VI-based MCB pointer is contained in the VI-based stats block, which is discussed in further detail in the attached Appendix.

TABLE 7

Metering Control Block

| Word | Bits | Name | Description |
|---|---|---|---|
| 0 | 31:0 | Green_bytes (lower) | Bottom 32 bits of green-metered bytes count |
| 1 | 31:0 | Ctokens | Number of bytes in C token bucket |
| 2 | 31:0 | Ptokens | Number of bytes in P token bucket |
| 3 | 31:0 | Metered_pkts (lower) | Bottom 32 bits of metered packet count. |
| 4 | 31:0 | Yellow_bytes (lower) | Bottom 32 bits of yellow-metered bytes count. |
| 5 | 31:0 | Red_bytes (lower) | Bottom 32 bits of red-metered bytes count. |
| 6 | 31:0 | Timeslot | 1 ms timeslot value |
| 7 | 31:0 | Reserved | |
| 8 | 31:0 | CIR | Committed information rate in bytes/timeslot |
| 9 | 31:0 | PIR | Peak information rate in bytes/timeslot |
| 10 | 31:0 | CBS | Committed burst size in bytes |
| 11 | 31:0 | PBS | Peak burst size in bytes |
| 12 | 63:32 | Metered_pkts (upper) | Upper 32 bits of metered packet count |
| 13 | 63:32 | Green_bytes (upper) | Upper 32 bits of green-metered bytes count |
| 14 | 63:32 | Yellow_bytes (upper) | Upper 32 bits of yellow-metered bytes count. |
| 15 | 63:32 | Red_bytes (upper) | Upper 32 bits of red-metered bytes count. |

According to one embodiment, software controls where and how the hardware accesses MCBs by setting up arrangements of MCB pointers. The MCB pointer data structure contains a 32-byte aligned memory pointer along with mode control bits as detailed in the table below. In its simplest form, the pointer field indicates the memory location of a single MCDB. In its most complex mode, the pointer indicates the location of an ordered array of up to 8 MCB pointers. When the hardware loads an MCB pointer array, it performs metering and rate marking starting with the first MCB pointer and continuing as directed by the NextPointer field in the MCB pointer. In one embodiment, software can disable rate marking completely by setting all 4 bytes of the MCB pointer to 0.

TABLE 8

MCB Pointer Format

| Bit Field | Name | Description |
|---|---|---|
| 31:5 | Memory Pointer | This field contains a memory pointer to an MCB, an MCB pointer array or a Rate Marking Translation Table. The Metering Mode field determines which mode to use. |
| 4:3 | Metering Mode | This field determines to what structure the Memory Pointer field points: 0: MCB - Color Blind 1: MCB - Color Aware 2: MCB Array 3: Reserved |
| 2:1 | Drop Policy | This field indicates the traffic policing policy: 0: No dropping 1: Drop on red marking only 2: Drop on yellow or red marking 3: Reserved |
| 0 | Next Pointer | This field indicates whether the hardware should continue to the next MCB pointer in an array: 0: Stop after the current pointer 1: Continue to the next MCB pointer in the array. |

It should be noted that depending upon the particular needs, in accordance with various embodiments, metering can be applied at a packet and/or byte level based on the number of packets or bytes transferred in the flow.

Figure 6:
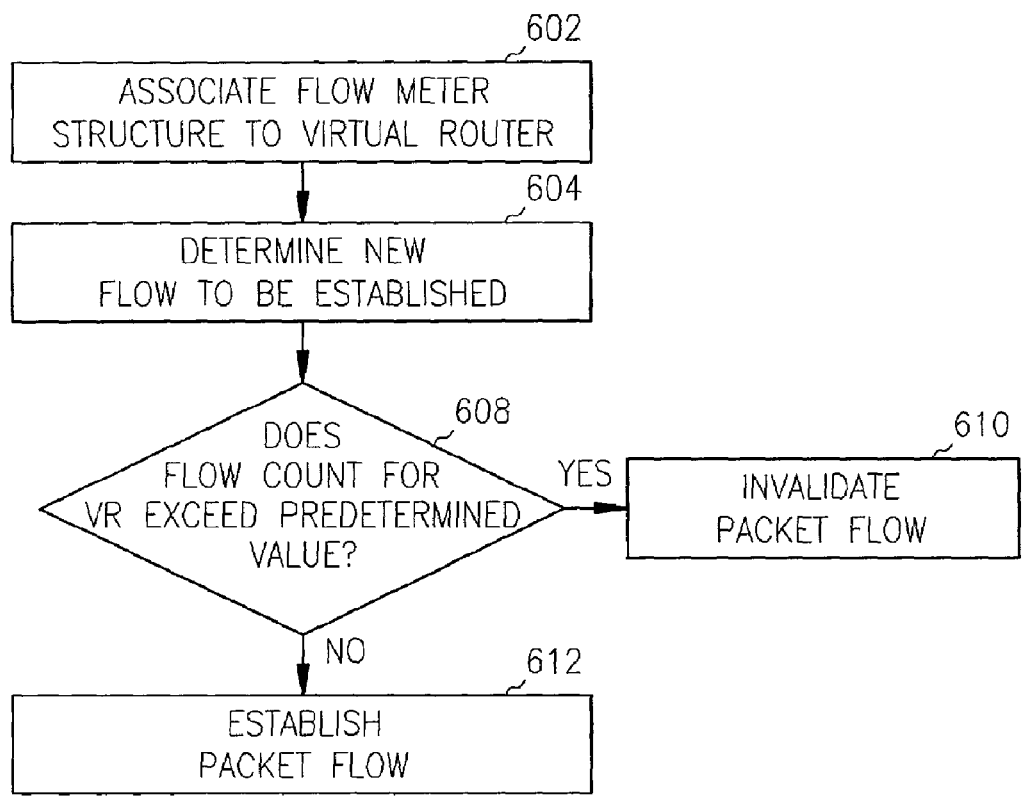
FIG. 6 is a flowchart illustrating a method for limiting resource consumption for hardware accelerated packet flows according to one embodiment of the present invention

FIG. 6 is a flow chart illustrating a method for limiting resource consumption for hardware accelerated packet flows according to one embodiment of the present invention. The method begins by associating a flow meter structure to a virtual router (block 602). Next, the system executing the method determines that a new flow is to be established for the virtual router (block 604). The system then checks to see if the flow count (i.e., the number of flows associated with the VR) would exceed a predetermined value (block 608). If so, the new packet flow is invalidated (block 610). Alternatively, the packet flow need not be created. Otherwise, hardware accelerated packet flow is established.

The flow cap feature is intended to allow the system to restrict the number of flows in the flow cache a particular VR can consume. Packets are associated with a flow cap structure based on LQID, an index into the flow cap table is located in the ingress statistics block.

The FlowCap field of the flow cap structure is used to set the maximum number of flows allowed and to disable flow cap processing with a value of 0. If flow cap processing is disabled no further processing is performed. Otherwise, the flow cap structure is checked to see if the current time interval has expired, if the structure needs to be initialized or if there is a mismatch between the FlowCapTags in the structure and the FCB. When software sets up a flow cap structure, the ExpTime field is initially set to 0. This indicates to the microcode that the structure needs to be initialized and timer expiration processing will be performed. When the timer has expired, the flow cap structure will be updated for the next interval, FlowCount will be copied to PrevMax, FlowCount will be set to 1 to count the current flow, FlowCap Tag will be incremented and ExpTime will be set to current_time+ExpInterval. When a flow is counted due to expiration or tag mismatch the FCB will be updated to copy the FlowCapTag from the flow cap structure to the FCB. If a flow with a tag mismatch is processed, but the flow cap has been reached then the FCB will be invalidated and the packet discarded.

In one embodiment, new flows are also counted; and if the flow cap is exceeded the flow will not be established.

To insure that timer expiration is correctly identified, in one embodiment, the ExpInterval is set to less than half the full range (2G). With time units of 1 ms, this allows for up to 24 days for the maximum interval, far greater than expected for actual use.

TABLE 9

Flow Cap Structure

| Word | Bits | Name | Description |
|---|---|---|---|
| 0 | 31:0 | FlowCount | Active flow count for the current time interval |
| 1 | 31:0 | PrevMax | Active flow count from the previous time interval |
| 2 | 31:0 | ExpTime | Time stamp when this interval will be over |
| 3 | 31:24 | FlowCapTag | Tag to match against FCB to determine if flow has been counted |
| | 23:0 | Reserved | |
| 4 | 31:0 | ExpInterval | Length of the flow count interval in milliseconds |
| 5 | 31:0 | FlowCap | Maximum number of flows allowed (0 disables flow cap) |
| 6 | 31:0 | Reserved | |
| 7 | 31:0 | Reserved | |

In some embodiments of the present invention, a multiprocessor system that uses a shared memory, a cache lock bit is used to enforce ownership of a shared data structure, such as one of the data structures described above or in the attached Appendix. When a first processor, such as packet processor 206 loads a data structure, the lock bit is set in the cache tag store. A second processor requesting the data structure is denied access until the lock bit is reset. The lock bit is reset when the first processor completes an update of the data structure. When requesting access to the data structure, the first processor performs a "load-memory-lock," and when complete, the first processor performs a "store-memory-unlock." Accordingly, only one processor may update a data structure in cache at a time. Data structures include metering control blocks and status blocks. The cache lock bit is included within the cache tag store for each data element in the cache.

CONCLUSION

Systems and methods for hardware accelerated packet routing are disclosed. Although specific embodiments have been illustrated and described herein, the foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method comprising:
    establishing, by flow learning software running on a processor of a processing element of a plurality of processing elements of a virtual router-based network device, a flow data structure within a memory of the processing element, the flow data structure including (i) information identifying a plurality of current packet flows associated with a plurality of virtual routers running within the processing element and (ii) corresponding forwarding state information for each of the plurality of current packet flows, wherein each of the plurality of virtual routers comprise an instance of software, executing within a processor of the processing element, that emulates functionality of an individual physical router and to which at least a subset of physical hardware resources of the processing element are partitioned;
    receiving, by a packet forwarding engine of the processing element, an incoming packet;
    determining, by the packet forwarding engine, whether the incoming packet is associated with any of the plurality of current packet flows by accessing the flow data structure based on a header associated with the incoming packet;
    if the incoming packet is associated with a current packet flow of the plurality of current packet flows, then
        determining, by the packet forwarding engine, whether the incoming packet is to be hardware forwarded or software forwarded based on the forwarding state information corresponding to the current packet flow;
        if the incoming packet is to be hardware forwarded, then hardware forwarding the incoming packet, by the packet forwarding engine, via a network interface of the virtual router-based network device without intervention by the processor; and
        otherwise, if the incoming packet is to be software forwarded, then software forwarding the incoming packet, by an appropriate virtual router of the plurality of virtual routers, via the network interface; and
    otherwise, if the incoming packet is not associated with any of the plurality of current packet flows, then providing information regarding the incoming packet to the flow learning software on the processor to allow the flow data structure to be updated to include information identifying a flow with which the incoming packet is associated within the plurality of current packet flows.

2. The method of claim 1, further comprising:
    associating a rate metering structure with each of the plurality of current packet flows;
    maintaining a corresponding rate statistic for each current packet flow in the rate metering structures; and
    upon detecting that the corresponding rate statistic is exceeded for a particular current packet flow of the plurality of current packet flows dropping packets associated with the particular current packet flow.

3. The method of claim 1, further comprising:
    associating a flow metering structure with each of the plurality of virtual routers;
    upon detecting a packet flow is to be assigned to a virtual router of the plurality of virtual routers, incrementing a flow counter in the flow metering structure;
    comparing the flow counter to a predetermined limit value; and
    if the flow counter does not exceed the predetermined limit value then establishing the packet flow as one of the plurality of current packet flows, otherwise refusing to establish the packet flow as one of the plurality of current packet flows.

* * * * *